United States Patent
Sugahara et al.

[15] 3,650,681
[45] Mar. 21, 1972

[54] METHOD OF TREATING A TITANIUM OR ZIRCONIUM SALT OF A PHOSPHORUS OXYACID

[72] Inventors: Yujiro Sugahara, Tokyo; Hiroyuki Naito; Kiyoshi Takai; Kouichi Usui, all of Tsuruoka-shi, Japan

[73] Assignee: Mizusawa Kagaku Kogyo Kabushiki Kaisha, Osaka, Japan

[22] Filed: Aug. 5, 1969

[21] Appl. No.: 847,633

[30] Foreign Application Priority Data

Aug. 8, 1968 Japan....................................43/55974
Nov. 27, 1968 Japan....................................43/86350

[52] U.S. Cl....................................23/21, 23/140, 23/202, 23/223, 23/242
[51] Int. Cl. ....................................C22b 59/00
[58] Field of Search ....................23/15 W, 21, 140, 202, 223, 23/242

[56] References Cited

UNITED STATES PATENTS

| | | | |
|---|---|---|---|
| 1,168,495 | 1/1916 | Gray | 23/223 X |
| 2,733,134 | 1/1956 | Aagaard et al. | 23/223 X |
| 2,974,016 | 3/1961 | Horton et al. | 23/223 |
| 3,471,252 | 10/1969 | Sugahara et al. | 23/223 |

FOREIGN PATENTS OR APPLICATIONS

| | | | |
|---|---|---|---|
| 18,785 | 1895 | Great Britain | 23/223 |

*Primary Examiner*—Herbert T. Carter
*Attorney*—Sherman and Shalloway

[57] ABSTRACT

A method of treating a titanium or zirconium salt of a phosphorus oxyacid, which comprises heating a mixture of carbon and a titanium or zirconium salt of a phosphorus oxyacid at a temperature exceeding 900° C. in a non-oxidizing atmosphere or heating a titanium or zirconium salt of a phosphorus oxyacid at a temperature exceeding 900° C. in absence of carbon in a carbon monoxide atmosphere, thereby separating the phosphorus oxyacid component as phosphorus vapor and recovering the titanium or zirconium component as solid residue.

4 Claims, No Drawings

METHOD OF TREATING A TITANIUM OR ZIRCONIUM SALT OF A PHOSPHORUS OXYACID

This invention relates to a method of treating a titanium or zirconium salt of a phosphorus oxyacid, and more specifically, it relates to a method of separating a titanium or zirconium salt of a phosphorus oxyacid into phosphorus and an oxide of titanium or zirconium.

As the method of separating a titanium or zirconium salt of a phosphorus oxyacid into a titanium or zirconium component and a phosphorus oxyacid component, there has been known a method comprising heating a titanium or zirconium salt of a phosphorus oxyacid and a halide of an alkaline earth metal at a temperature exceeding the melting point of said alkaline earth metal halide and recovering titanium or zirconium in the form of a tetrahalide thereof (see, for instance, the specification of British Pat. No. 692,091). There has been also known a method comprising heating a titanium or zirconium slat of a phosphorus oxyacid together with an alkali metal hydroxide or calcium carbonate or reacting the above reactants in water, and recovering titanium or zirconium in a form of a hydroxide or oxide thereof (see, for instance, the specification of British Pat. No. 290,684).

However, these methods are defective in that the phosphoric acid component is recovered in the form of an alkali metal or alkaline earth metal phosphate of a small utility value. The former method is further defective in that in order to obtain titanium oxide or zirconium oxide which is useful as pigment it is necessary to oxidize the once recovered titanium tetrahalide or zirconium tetrahalide with the use of oxygen.

We have found a novel method of treating a titanium or zirconium salt of a phosphorus oxyacid wherein the phosphorus oxyacid component can be directly recovered as phosphorus of the greatest utility value and the titanium or zirconium component as titanium oxide or zirconium oxide which is useful as pigment.

The primary object of the present invention is to provide a method of treating a titanium or zirconium salt of a phosphorus oxyacid which makes it possible to separate from the titanium or zirconium salt of a phosphorus oxyacid the titanium or zirconium component and the phosphorus oxyacid component in the most industrially advantageous forms.

Another object of the present invention is to provide a method of treating a titanium or zirconium salt of a phosphorus oxyacid which makes it possible to recover the phosphorus oxyacid component in the form of phosphorus.

Still another object of the present invention is to provide a method of treating a titanium or zirconium salt of a phosphorus oxyacid which makes it possible to recover the titanium or zirconium in the form of a metal or an oxide.

Still another object of the present invention is to provide a method of preparing an oxide of titanium or zirconium excellent in whiteness and hiding power from a titanium or zirconium salt of a phosphorus oxyacid.

Still another object of the present invention is to provide a method in which a titanium or zirconium salt of a phosphorus oxyacid whose purification can be easily operated is selected as the starting material containing the titanium or zirconium component and the phosphorus oxyacid component, and in which by heating the above starting material in the presence of carbon or carbon monoxide, there can be obtained pure phosphorus and an oxide of titanium or zirconium substantially free from metallic impurities and from the phosphorus oxyacid component bonded thereto.

In accordance with the present invention, the above objects can be attained by a method of treating a titanium or zirconium salt of a phosphorus oxyacid which comprises heating a mixture of carbon and a titanium or zirconium salt of a phosphorus oxyacid in a nonoxidizing atmosphere at a temperature exceeding 900° C. or heating the titanium or zirconium salt of a phosphorus oxyacid in the absence of carbon in a carbon monoxide atmosphere at a temperature exceeding 900° C., thereby separating the phosphorus oxyacid component in the form of phosphorus vapor and recovering the titanium or zirconium component as solid residue.

In the present invention, a titanium or zirconium salts of phosphorus oxyacids are used as starting material for titanium or zirconium. Such salts are known substances and in the present invention, any of titanium or zirconium salts of phosphorus oxyacids may be used. It has been known that titanium orthophosphate can be obtained by adding orthophosphoric acid or a water-soluble salt thereof to a sulfuric acid solution of titanium (see, for instance, the specification of British Pat. No. 261,051) and that zirconium phosphate can be obtained by adding phosphoric acid to a zirconium salt solution. A titanium salt of a phosphorus oxyacid to be used in the present invention can be generally prepared with ease by reacting an inorganic or organic acid solution of a titanium compound, a titanium salt per se or amorphous titanium oxide with a phosphorus oxyacid or a derivative thereof in the presence of water. A zirconium salt of a phosphorus oxyacid can be prepared with ease by reacting an inorganic or organic acid solution of a zirconium compound or a zirconium salt per se with a phosphorus oxyacid or a derivative thereof in the presence of water.

As the phosphorus oxyacid, any of phosphorus oxyacids can be used in this invention. For instance, orthophosphoric acid ($H_3PO_4$), metaphosphoric acid ($HOP_3$), pyrophosphoric acid ($H_4P_2O$), hexametaphosphoric acid [$(HPO_3)_6$], tripolyphosphoric acid ($H_5P_3O_{10}$), phosphorous acid ($H_3PO_3$) and hypophosphorous acid ($H_3PO_2$) are used. Further, for the purpose of imparting these phosphorus oxyacid components, there may be also used derivatives of phosphorus oxyacids such as anhydrides (for instance, phosphorus pentaoxide), halides, oxyhalides, and salts of an alkali metal, an alkaline earth metal, ammonium, zinc and aluminum.

In the titanium or zirconium salt of a phosphorus oxyacid, the atomic ratio of titanium or zirconium to phosphorus may be within a broad range.

However, generally speaking, it is preferred that when the titanium or zirconium metallic component in the phosphorus oxyacid salt is expressed as $MO_2$ and the phosphorus oxyacid component as $P_2O_5$, $P_2O_5$ is contained in an amount of ranging from 0.01 to 3 moles, especially from 0.1 to 2 moles per mole of $MO_2$. In case the phosphorus oxyacid component is present in an extremely large amount within the above range, it does not give any substantial advantage to the recovery of the titanium or zirconium component, and only phosphorus can be recovered in a great amount as the phosphorus oxyacid component, resulting in no other economical advantage. On the other hand, in case the amount of the phosphorus oxyacid component is too small, the titanium or zirconium salt of a phosphorus oxyacid cannot be obtained in the form of a gel and it sometimes becomes difficult to agglomerate the titanium or zirconium salt of a phosphorus oxyacid and remove metallic impurities therefrom by extraction, with the consequence that it becomes impossible to use a titanium or zirconium salt of a phosphorus oxyacid of a high purity. Accordingly, it is especially preferred in the present invention that the content of the phosphorus oxyacid component, expressed in terms of the $MO_2 : P_2O_5$ mole ratio, is within a range of $1 : 1.5 - 0.1$.

An optional titanium salt of a phosphorus oxyacid may be used in the present invention, but, as mentioned above, it is especially preferable to use a gel of a titanium salt of a phosphorus oxyacid prepared by a method which comprises forming a liquid mixture composed mainly of a titanium salt of a phosphorus oxyacid, molding it into a gel of small masses and extracting metallic impurities from said gel of small masses.

In accordance with the above method it is possible to prepare a titanium salt of a phosphorus oxyacid substantially free from metallic impurities such as Fe, Mo, V, Cr, F and As, from titanium-containing ores such as ilmenite, iron sand slag, rutile and high-titanium, slag, with the use of such starting phosphorus oxyacid as crude phosphoric acid and purified phosphate rock. Accordingly, since a titanium salt of a phosphorus oxyacid prepared by the above method can give high-purity phosphorus and metallic titanium or titanium oxide which need not be purified by after-treatments, the use of the titanium salt of a phosphoric oxyacid prepared by the above mentioned method is particularly preferred.

Although an optional zirconium salt of a phosphorus oxyacid may be used in the present invention, from the industrial view-point it is preferable to use a gel of a zirconium salt of a phosphorus oxyacid prepared by a method which comprises adding a phosphorus oxyacid or a derivative thereof capable of releasing a phosphorus oxyacid under the reaction conditions, to a solution of a zirconium concentrate such as zircon sand (ZrO SiO ) and baddeleyite in a mineral acid such as sulfuric acid, hydrochloric acid and nitric acid, thereby forming a gel composed mainly of a zirconium salt of a phosphorus oxyacid and removing metallic impurities from the gel by extraction.

In case a mixture of carbon and a titanium or zirconium salt of a phosphorus oxyacid is heated in a nonoxidizing atmosphere in accordance with the present invention, it is possible to add impure carbon to a zirconium or titanium salt of a phosphorus oxyacid prior to the above mentioned purification treatments and extract resulting granules to thereby remove coincidentally impurities contained in the salt and impurities contained in carbon.

It is preferred that the titanium or zirconium salt of a phosphorus oxyacid to be used in the present invention has such a purity that mineral acid ions such as $SO_4^{--}$, $Cl^-$ and $NO_3^-$ will not be detected by qualitative analysis in the liquor used for water-washing said salt. In case such mineral acid ions remain in the titanium or zirconium salt of a phosphorus oxyacid, even if a mixture of carbon and said salt is heated in a nonoxidizing atmosphere or said salt is heated in the absence of carbon in a carbon monoxide atmosphere, there is a tendency that a minute or small amount of the phosphorus oxyacid component remains in the titanium or zirconium component residue. Accordingly, it is preferably to remove mineral acid ions from a titanium or zirconium salt of a phosphorus oxyacid as much as possible prior to the heating of said salt in the presence of carbon or carbon monoxide. Generally, mineral acid ions are substantially removed from a titanium or zirconium salt of a phosphorus oxyacid to such an extent that in the liquor used for water-washing said salt mineral acid ions cannot be detected by qualitative analysis, namely, to such an extent that the content of such mineral acid ions is, for instance, less than 100 p.p.m., especially less than 10 p.p.m.

In the present invention, the titanium or zirconium salt of a phosphorus oxyacid may be used as it is prepared by the above methods. It is also possible to use a titanium or zirconium salt of a phosphoric oxyacid from which a part of the phosphorus oxyacid component has been removed by subjecting the titanium or zirconium salt of a phosphorus oxyacid prepared by the above methods to a washing treatment with an alkaline aqueous solution.

The titanium or zirconium salt of a phosphorus oxyacid may be used in any form of a hydrogel, a dired gel, or a crystalline product obtained by calcining such gel.

In accordance with the present invention, the titanium or zirconium salt of a phosphorus oxyacid is heated at a temperature exceeding 900° C., either in the form of a mixture with carbon in a nonoxidizing atmosphere, or in the absence of carbon in a carbon monoxide atmosphere. Thus, the phosphorus oxyacid component can be separated as pure phosphorus vapor and the titanium or zirconium component can be recovered as solid residue of a metal or an oxide.

Any of coke, carbon black, active carbon and pitch may be used as carbon in the present invention. However, in order to recover the titanium or zirconium component in a pure form, it is preferred to use purified carbon, particularly carbon not containing impurities such as Fe, Mn, V and Cr. From this viewpoint, the use of carbon black is most preferred.

It is preferred that the carbon is used in an amount more than the equimolar amount to the phosphorus oxyacid component ($P_2O_5$) contained in the titanium or zirconium salt of a phosphorus oxyacid. More specifically, it is preferred to use carbon in an amount of at least 5 moles, especially ranging from 5 to 10 moles, per mole of the phosphorus oxyacid component expressed as $P_2O_5$.

In accordance with the present invention, carbon and a titanium or zirconium salt of a phosphorus oxyacid is homogeneously mixed together. In this mixing, in case both starting materials are solid, a homogeneous mixture of them may be prepared by mixing and grinding them by a dry method. A homogeneous mixture may be also prepared by wet mixing and grinding both starting materials with the use of a liquid medium, followed by drying. Still further, in case a hydrogel of a titanium or zirconium salt of a phosphorus oxyacid is used, a homogeneous mixture may be prepared by kneading the hydrogel with carbon to form a pastelike mixture and drying the same. In any case, such mixture may be beforehand molded to small masses of an optional form, such as pellet, flake, plate, sphere or tablet. The use of a mixture which has been molded into such small masses is especially preferred, because it results in efficient generation and separation of phosphorus vapor.

Still further, in the present invention, a mixture prepared by adding carbon before the formation of a gel of a titanium or zirconium salt of a phosphorus oxyacid from a titanium or zirconium salt and a phosphorus oxyacid or its derivative, or before the molding of a sol or gel of a titanium or zirconium salt of a phosphorus oxyacid into small masses, and washing the resultant mixture with an acid and water, may be applied to the reaction.

In the present invention, a mixture of carbon and a titanium or zirconium salt of a phosphorus oxyacid is heated at a temperature exceeding 900° C. in a nonoxidizing atmosphere. The preferable heating temperature range varies depending on the class of the starting salt, but generally speaking, a range of 900°–1,100° C. is preferred. In the case of the zirconium salt, a range of 900°–1,050° C. is especially preferred, and in the case of the titanium salt, a range of 930°–1,100° C. is especially preferred. As the nonoxidizing atmosphere there may be used many optional gas as far as it is nonoxidizing and inert to phosphorus, particularly preferred nonoxidizing atmospheres are, carbon monoxide, nitrogen, argon and the like.

In another embodiment of the present invention, the above mentioned titanium or zirconium salt of a phosphorus oxyacid is heated in the absence of carbon in a carbon monoxide atmosphere. As described above, the titanium or zirconium salt of a phosphorus oxyacid can be separated into phosphorus and an oxide of titanium or zirconium by heating it in the presence of carbon. However, industrially available carbon such as coke, carbon black and active carbon frequently contains impurities such as iron and silicon, and there is a tendency that the resulting oxide of titanium or zirconium is contaminated with such impurities. Of course, it is possible to use pure carbon or remove impurities from industrially available carbon by purification. But use of pure carbon or purification of impure carbon increases the preparation costs of the resulting oxide of zirconium or titanium.

In accordance with this embodiment of the present invention, the separation of phosphorus and titanium or zirconium oxide may be performed by employing only carbon monoxide gas without using carbon. Accordingly, no contamination of the resulting oxide of titanium or zirconium is caused to occur.

As carbon monoxide there may be used not only pure carbon monoxide but also an industrial gas containing carbon monoxide. For instance, city gas, producer gas and the like may be used. But, in view of the fact that phosphorus is separated in the vapor form, it is preferred to use a gas not containing hydrogen. The pressure of carbon monoxide to be used is generally not critical, and it may be either atmospheric or superatmospheric. In short it is essential that carbon monoxide is made present in an amount more than the equivalent amount to the phosphorus oxyacid component ($P_2O_5$) contained in the titanium or zirconium salt of a phosphorus oxyacid, namely in an amount of at least 5 moles per mole of the phosphorus oxyacid component expressed as $P_2O_5$. Of course, it is also possible to use carbon monoxide in an excessive amount and recycle the exhausted excessive carbon monoxide to the heating step.

In this embodiment of the present invention, a titanium or zirconium salt of a phosphorus oxyacid is heated at a temperature exceeding 900° C. in a carbon monoxide atmosphere. The preferable heating temperature range varies depending on the class of the starting salt. Generally, the preferable heating temperature is within a range of from 900° to 1,100° C. In the case of the zirconium salt, a range of from 900° to 1,050° C. is especially preferred, and in the case of the titanium salt, a range of from 930° to 1100° C. is especially preferred.

In accordance with the method of the present invention, the titanium or zirconium salt of a phosphorus oxyacid is reduced, and hence, the phosphorus oxyacid component is formed into phosphorus vapor and the titanium or zirconium component is left in the form of a metal or an oxide. Accordingly, it is possible to recover phosphorus vapor and a solid residue of zirconium or titanium by customary known recovery procedures.

For recovering gaseous phosphorus efficiently it is preferred to introduce the above mentioned CO gas as carrier into a reactor. As the reactor there may be used a crucible, a furnace, a heating furnace of a fixed bed type, a moving bed type or a fluidized bed type, or a conventional batchwise or continuous heating furnace such as a rotary kiln, a Herreschoff furnace and a flash roaster.

The resulting phosphorus vapor may be either used for the preparation of various phosphorus compounds as it is, or recovered as white, yellow or red phosphorus by cooling the vapor with an optional cooling medium. In the case of recovering phosphorus, in view of the safety it is preferred to recover it in the form of red phosphorus in a customary known manner. For instance, the phosphorus vapor is introduced into a recovering device or vessel maintained at approximately 260° C. to 420° C. and is condensed in the form of red phosphorus.

Titanium or zirconium recovered as solid residue is in the oxide form. Sometimes, a greater portion of titanium or zirconium takes an oxide form but an extremely small portion takes a form of a metal or a suboxide. Accordingly, the resulting titanium or zirconium residue is converted to white titanium oxide or zirconium oxide after calcination either as it is recovered or optionally after water-washing. The resulting titanium oxide already exhibits a rutile-type crystal structure. However, in order to develop crystals of such titanium oxide, it is preferred to further calcine it at a temperature exceeding 800° C. in an oxygen atmosphere.

The so obtained titanium oxide or zirconium oxide is substantially free from the phosphoric component and is extremely excellent over known titanium oxides and zirconium oxides with respect to whiteness, particularly reflectivity in the ultraviolet zone. Further, it is substantially free from metallic impurities.

Still further, the titanium oxide or zirconium oxide obtained in accordance with the method of the present invention consists of fine spherical particles substantially free from coagulated particles. Accordingly, such particles exhibit a hiding power comparable to, or higher than, that of a commercially available titanium oxide or zirconium oxide, even when they are not finely pulverized.

Still further, the present invention can enjoy an advantage that the phosphorus oxyacid component in a titanium or zirconium salt of a phosphorus oxyacid can be recovered in the form of pure phosphorus which is of the greatest industrial utility value.

The present invention will be hereinafter detailed by referring to examples.

EXAMPLE 1

This example illustrates a method of treatment of titanium phosphate wherein purified titanium phosphate prepared using as starting materials crude phosphoric acid and a solution of a crude titanium salt is calcined in an atmosphere of carbon monoxide to recover the phosphorus component formed at this time as red phosphorus while, on the other hand, recovering rutile from the residue not containing the phosphorus component by calcinating it in an oxygen atmosphere.

A. Preparation of the purified titanium phosphate.

Crude phosphoric acid having the following composition is used as the starting phosphoric acid component.

| | |
|---|---|
| $P_2O_5$ | 54.5 (wt. %) |
| CaO | 0.15 |
| MgO | 0.45 |
| $Al_2O_3$ | 0.85 |
| $Fe_2O_3$ | 1.10 |
| F | 0.30 |
| Free sulfuric acid ($H_2SO_4$) | 1.70 |
| $SiO_2$ | 0.10 |
| $Na_2O$ | 0.7 |
| $K_2O$ | 0.1 |

On the other hand, as the starting titanium component is used a sulfuric acid solution of titanium salt, which is obtained by mixing iron sand slag (produced in Aomori Prefecture, Japan) powder with concentrated sulfuric acid and water, reacting the mixture by heating and thereafter recovering the intended sulfuric acid solution of titanium salt by separating the unreacted materials and gypsum formed; the composition of the solution being as follows:

| | |
|---|---|
| $TiO_2$ | 6.07 (wt. %) |
| $Ti_2O_3$ | 0.21 |
| $FeO_2$ | 2.10 |
| $Al_2O_3$ | 4.52 |
| MgO | 0.95 |
| $U_2O_5$ | 0.05 |
| $Cr_2O_3$ | 0.002 |
| Mn | 2.5 |
| Free sulfuric acid ($H_2SO_4$) | 1.10 |

110 Grams of the foregoing crude phosphoric acid is added at once to 1 kg. of the sulfuric acid solution of titanium salt recovered as hereinabove described, followed by stirring to obtain a homogeneous mixed sol. This sol is cast onto a heated plate in film form and gelled by heating for 30 minutes at 120° C., thus obtaining a mass of flaky, hydrogel of blackish purple color.

The so obtained mass is packed in a washing tower and is acid-washed with two types of acid solutions, one a sulfuric acid solution of pH 0.5 and another a sulfuric acid solution of 30 grams per 100 ml. concentration, and removing by extraction and washing the impure metallic constituents such as iron, aluminum and vanadium contained in the hydrogel. This is followed by water-washing until the presence in the washing water of the sulfate group is no longer noted qualitatively, thus obtaining small masses of the hydrogel of titanium phosphate containing substantially no impure metallic constituents. When the composition of this titanium phosphate gel was analyzed, it was found that the mole ratio of $TiO_2:P_2O_5$ was 1.47:1, the moisture content of the hydrogel (110° C., 3 hours drying) was 71.0 percent, and that the phosphoric acid component of the starting crude phosphoric acid was purified and fixed as titanium phosphate at a fixation rate of 98.5 percent. Further, when the here obtained purified titanium phosphate gel was analyzed for its content of impure constituents by the emission spectrophotometric method, it was confirmed that impure metallic constituents, such as iron, aluminum, fluorine, lead, arsenic, vanadium, chromium, calcium and magnesium, were not present.

B. Treatment of titanium phosphate by means of carbon monoxide.

The hydrogel of titanium phosphate in which the phosphorus component and titanium component have been readily fixed and separated from the impure metallic constituents is molded into pellets of columnar form of diameter about 1.5 mm. and length about 5–15 mm. using a extruding granulator and thereafter dried thoroughly at 110° C.

The dried product of columnar particulate form is charged to a reaction tube of a reaction apparatus and reacted by heating in carbon monoxide. The reaction apparatus used is made up of a reaction tube and a phosphorus recovery apparatus. The reaction tube which comprises a quartz glass tube 55 cm. long and 3 cm. in diameter is used vertically. Thirty cm. of its middle portion is placed in an electric furnace which is capable of heating the tube up 1,200°1,20' C. In its bottom part a gaseous atmosphere of carbon monoxide is maintained. The bottom is provided with an entry port from which carbon monoxide is introduced, which becomes the carrier gas for the phosphorus vapor formed. On the other hand, a discharge port is provided at the top for the carrier gas and the phosphorus vapor formed. Heat-resistant porcelain balls 3 mm. in diameter are packed in the bottom part of the reaction tube so as to make possible the placement of the hereinabove prepared dried titanium phosphate of columnar particulate form at the middle portion (30 cm.) of the reaction tube, after which about 20 grams of the dried product is so placed above the packed balls.

As the phosphorus recovery apparatus, a Pyrex glass tube 300 cm. long and 2 cm. in diameter is used. This glass tube is packed with porcelain balls 2 mm. in diameter, and provisions are made so as to enable the glass tube to be heated and maintained at a temperature of 360° ± 5° C., by means of an air bath. This phosphorus recovery apparatus is connected to the discharge port of the reaction tube, from whence the phosphorus vapor formed therein is conducted along with the carrier gas into the recovery apparatus maintained at 360° ± 5° C. where the phosphorus vapor is condensed on the porcelain balls as red phosphorus.

The carbon monoxide used, which is introduced from the entry port at the bottom of the reaction tube, is used for maintaining the reducing atmosphere as well as cycled and used as the carrier gas for the phosphorus vapor formed. The rate of flow of the gas at this time is held to a rate of about one liter per minute.

When the dried product of titanium phosphate of columnar particulate form is charged to the reaction tube as hereinabove described and the temperature of the reaction apparatus filled with carbon monoxide is gradually raised to the vicinity of 920° C., the formation of phosphorus vapor is noted. Next, when the temperature is held at 950°–1,000° C., phosphorus is seen to condense as red phosphorus on the porcelain balls of the phosphorus recovery apparatus maintained at 360° ± 5° C. When this state is maintained for 90 minutes, the reaction is completed.

After completion of the reaction the porcelain balls on which has been condensed the red phosphorus which can be safely touched with hand are taken out, and using porcelain balls themselves as the comminution medium the wet comminution of the red phosphorus is carried out in customary manner followed by drying, whereupon powdery red phosphorus is recovered. The porcelain balls from which the red phosphorus has been removed are again packed in the phosphorus recovery apparatus to be reused as the packing material.

On the other hand, a gray solid reaction residue of columnar particulate form remains in the reaction tube after the completions of the reaction. When this sold reaction residue is calcined at a temperature above 500° C. in an oxygen atmosphere, it becomes pure white, which, when analyzed for its composition, was 100 percent $TiO_2$, containing no phosphorus component at all. Further, when calcined at a temperature above 800° C., titanium dioxide which has been converted to rutile, when analyzed by X-rays is obtained.

When the reflectivity of the here obtained rutile is determined by means of the powder method using a spectrophotometer using as the standard plate one of alumina ($Al_2O_3$) with reflectivity at wavelengths 350, 400, 500 and 600 $\mu$, it can be appreciated that reflectivities (percent) which excel that of the commercially available rutile is demonstrated especially in the ultraviolet region, as shown in Table I. It was further found by observing with an electron microscope that the individual crystallize particles of titanium dioxide obtained by this calcination operation were nearly uniform minute particles of ovoid shape of about 0.3–1 micron, even though no special comminuting operation was performed. Thus, it can be seen that the tendency of aggregation of the titanium dioxide particles during step of forming the titanium dioxide particles in the conventional method of producing titanium dioxide has been solved. Further, when the covering power of the here obtained uncomminuted titanium dioxide and that of the commercial rutile were measured in accordance with the method of JIS K510 (196) using a cryptmeter, it is seen that a covering power (the cryptmeter reading in millimeter is used as such to indicate the covering power) of the former is equally good as that of the commercial product. Therefore, the here obtained finely divided rutile of high purity can be used as a white pigment in its as-obtained state.

Further, from the fact that there is no phosphorus component remaining at all in the residue, it can be seen that the powdery red phosphorus is recovered at a yield of practically 100 percent red phosphorus. Although crude phosphoric acid and a solution of crude titanium salt is used as the starting materials, the red phosphorus recovered is of such high purity as do not require any further purification at all, because the titanium phosphate has been readily purified to high purity. Hence it finds wide use for such food and drug purpose in which the presence of impure metallic constituents such as lead, arsenic, iron and vanadium or fluorine is not permitted at all, as well as for pure phosphoric acid.

It can be appreciated from the foregoing description that titanium phosphate in which the phosphorus and titanium components have been readily fixed and purified is effectively processed by heating and reacting under an atmosphere of carbon monoxide to readily yield red phosphorus and rutile of high utility value.

TABLE I

| Titanium Dioxide | Reflectivity (%) (Wavelength m$\mu$) | | | | Covering Power (mm.) |
|---|---|---|---|---|---|
| | 350 | 400 | 500 | 600 | |
| Rutile of present invention | 19.0 | 65.0 | 98.0 | 98.5 | 3.2 |
| Commercial rutile | 7.8 | 52.8 | 93.7 | 94.0 | 3.2 |

EXAMPLE 2

This examples illustrates a method of treatment of zirconium phosphate wherein purified zirconium phosphate prepared using as starting materials crude phosphoric acid and a solution of a crude zirconium salt is heated in an atmosphere of carbon monoxide to recover the phosphorus formed at this time as red phosphorus while, on the other hand, recover the zirconium component as zirconium oxide.

A. Preparation of purified zirconium phosphate.

As the starting phosphoric acid, crude phosphoric acid (54.5 percent as $P_2O_5$) is used.

As the starting zirconium component is used a sulfuric acid solution of zirconium salt, which is obtained by acid decomposing zirconium sand (zircon) and separating the silicic acid component and unreacted reactants by filtration to recover the foregoing solution having the following composition:

| | |
|---|---|
| $ZrO_2$ | 12.3 (wt. %) |
| $Fe_2O_3$ | 0.03 |
| $Al_2O_3$ | 0.01 |
| Free $H_2SO_4$ | 11.5 |

230 Grams of the foregoing crude phosphoric acid is stirred with a commercial mixer (2,000 r.p.m.) at room temperature. To this is then added at once one kg. of the recovered sulfuric acid solution of zirconium salt with stirring to thus obtain a pasty gel predominantly of zirconium phosphate. This pasty gel is separated from the mother liquor using Buchner's filtration apparatus to render it into a cakelike gel, after which the impure metallic constituents, such as iron and aluminum, continued in the cakelike gel are removed by washing, this being accomplished by acid-washing the cake with a sulfuric acid solution of 20 grams per 100 ml. concentration. Next, water-washing is carried out until the presence in the washing water of the sulfate group is no longer noted qualitatively, thus obtaining a hydrogel of zirconium phosphate containing substantially no impure metallic constituents. When the composition of this zirconium phosphate was analyzed, it was found that the mole ratio of $ZrO_2:P_2O_5$ was 1:1, the moisture content of the hydrogel (110° C., 3 hours drying) was 78.0 percent, and that the phosphoric acid component of the starting crude phosphoric acid was purified and fixed as zirconium phosphate at a fixation rate of 95.5 percent. Further, when the here obtained purified zirconium phosphate gel was analyzed for its content of impure metallic constituents by the emission spectrophotometric method, it was confirmed that impure constituents, such as iron, aluminum, fluorine, lead, arsenic, vanadium, chromium, calcium and magnesium, were not present.

B. Treatment of zirconium phosphate by means of carbon monoxide.

The prepared hydrogel of zirconium phosphate is molded into pellets of columnar form about 5–15 mm. long and about 1.5 mm. in diameter, using an extruder type pelleter, and thereafter dried thoroughly at 110° C.

Next about 20 grams of the dried product of columnar pellets form is charged in a reaction tube of a vertical reaction apparatus such as used in Example 1.

After charging of the dried product, carbon monoxide is introduced from the bottom of the reaction tube at the rate of one liter per minute and the heating temperature is slowly raised, whereupon the formation of phosphorous vapor is noted at from the vicinity of 920° C. when a temperature of 950°–1,000° C. is maintained, phosphorus condenses as red phosphorus on the porcelain balls of the phosphorus recovery apparatus maintained at 360° ±5° C. When this state is maintained for 90 minutes, the reaction is completed. Thereafter, by operating as in Example 1, the red phosphorus powder is recovered.

On the other hand, a gray, solid reaction residue whose particles are of columnar form remains in the reaction tube after the completion of the reaction. When this solid reaction residue is calcined at above 500° C. in an atmosphere of oxygen, it becomes pure white which, when analyzed for its composition, is 100 percent $ZrO_2$. Further, when the calcination is carried out at above 900° C., zirconia is formed, as determined by an analysis by X-rays. When the reflectivity of this zirconia is determined as in Example 1, it demonstrates a reflectivity which is especially excellent in the ultraviolet region, as shown in Table II. When this calcined product is observed with an electron microscope without comminution, zirconia particles of particle diameter 0.1–0.02 micron, which are dispersed, i.e., not caked, are seen. This white zirconia of high purity finds wide use as white pigment, as well as filler, glaze, refractory, etc.

From the fact that there is present no phosphorus component in the residue, it can be seen that the phosphorus was recovered at a yield of substantially 100 percent as pure red phosphorus.

Thus, it can be appreciated from the foregoing description that by using as the starting material zirconium phosphate wherein the phosphorus and zirconium components have been fixed and purified and reacting this starting zirconium phosphate by heating it in any atmosphere of carbon monoxide, the foregoing components are readily recovered as red phosphorus and zirconium dioxide, which possess high utility value.

TABLE II

| Zirconium Oxide | Reflectivity (%) (Wavelength mµ) | | | |
|---|---|---|---|---|
| | 350 | 400 | 500 | 600 |
| Zirconium dioxide of present invention | 78.5 | 97.5 | 103.5 | 104.0 |
| Commercial zirconium dioxide | 52.0 | 86.5 | 94.0 | 94.0 |

EXAMPLE 3

This example illustrates a method of recovering the phosphorus and titanium components by the heat treatment in an atmosphere of carbon monoxide the titanium salts of phosphorus oxyacids prepared using the various phosphorus oxyacids or their derivatives.

A. Preparation of the various titanium salts of phosphorus oxyacids.

As the starting titanium component is used a sulfuric acid solution of titanium salt obtained by adding water and concentrated sulfuric acid to finely divided ilmenite ore, reacting this mixture by heating, recovering the sulfuric acid solution of titanium salt from the resulting gruellike reaction product by extraction with water, and thereafter separating by cooling and crystallizing the iron sulfate which has become dissolved in the sulfuric acid solution at the same time in this case. The sulfuric acid solution of titanium salt recovered hereinabove has the following composition:

| | |
|---|---|
| $TiO_2$ | 25.6 (grams/100 ml.) |
| $Fe_2O_3$ | 16.2 |
| $Al_2O_3$ | 2.02 |
| $MgO$ | 1.80 |
| $V_2O_5$ | 0.04 |
| $Cr_2O_3$ | 0.002 |
| Mn | 0.18 |
| Free $H_2SO_4$ | 18.4 |

On the other hand, as the starting phosphoric acid component, the various commercially available reagent phosphorus oxyacids or their derivatives as well as ore are used.

As the ore, the phosphorus ore produced in Kola, U.S.S.R., after being thoroughly wet-ground, submission to elutriation and magnetically removed of part of its iron, is used. Its principal constituents are $P_2O_5$ 38.86 wt. percent, CaO 51.39 wt. percent, $Fe_2O_3 + Al_2O_3$ 0.48 wt. percent, $Na_2O + K_2O$ 0.29 wt. percent, $SiO_2$ 1.02 wt. percent and F 3.36 wt. percent.

Further, when using either the ore or other oxyacid salts of phosphorus, sulfuric acid in at least an equimolar quantity of the various oxyacid salts is added in advance to the sulfuric acid solution of titanium salt.

To the aforesaid sulfuric acid solution of titanium salt recovered from the ilmenite ore is added with stirring one of the various phosphorus oxyacids or derivatives thereof in an amount of one mole of the phosphorus component of the latter calculated as $P_2O_5$ to one mole of the titanium component of the former calculated as $TiO_2$, followed by rendering the two into a homogeneous liquid blend. Thereafter, by operating as in Example 1 a gel of small masses predominantly of titanium salt of phosphorus oxyacid is obtained. Next, the impure metallic constituents contained in the gels are extracted and separated by using two classes of sulfuric acid solutions, one of a pH 0.5 and the other of 30 grams per 100 ml. concentration. This is followed by water-washing the gel to thus obtain substantially purified hydrogel of titanium salt of phosphorus oxyacid.

If in the case where gel predominantly of titanium-salt of phosphorus oxyacid has been prepared using either the phosphorus ore or the calcium salt of phosphorus oxyacid such as calcium phosphate, a hydrochloric acid solution of pH 0.5 is used as the extraction solvent and the calcium salt is removed.

The analysis of the composition (mole ratio composition) and the amount of impurities contained of the various purified titanium salt of phosphorus oxyacids are shown in Table III.

As is apparent from Table III, it is seen that the resulting titanium salts of phosphorus oxyacids do not contain any impure metallic constituents such as vanadium, iron, arsenic and fluorine regardless of the class of the phosphorus oxyacid used.

The amount of impurities contained shown in Table III are the results of having conducted the identification of the impure metallic constituents contained, using an emission spectrophotometer. The (−) sign means that amount was such that it could not be substantially detected with the emission spectrophotometer, the sign (±) denotes that a minute amount was detected, the sign (+) indicates that a pronounced amount was detected, and the sign (++) means that an especially large amount was detected. The impurities contained will hereinafter be indicated by these signs.

B. Treatment of the various titanium phosphates by means of carbon monoxide.

The various titanium salts of phosphorus oxyacids, described hereinbefore, are granulated, dried and prepared into dried products having particles of columnar form by operating as in Example 1.

When these dried products are each charged to a reaction tube of a reaction apparatus such as was used in Example 1 and are maintained for 90 minutes at 950°–1,000° C. as in Example 1 using carbon monoxide, the phosphorus component of each of the titanium salts of phosphorus oxyacids becomes a phosphorus vapor, which is then conducted by the gas of the atmosphere acting as a carrier gas to a phosphorus recovery apparatus maintained at 360°±5° C., where the vapor condenses on the porcelain balls of the recovery apparatus as red phosphorus. Each of the here formed red phosphorus products are recovered as red phosphorus powders by operating as in Example 1.

On the other hand, a gray, solid reaction residue of columnar particulate 800°remains behind in the reaction tube after the completion 1, of the reaction in each case. When these residues are calcinated at 800° C. in an oxygen atmosphere, pure white rutile is obtained in each instance. The reflectivity of these titanium dioxide products were determined as in Example 1, with the results shown in Table III.

On the other hand, from the fact that there was no phosphorus component present at all in the residues as shown in Table III as a result of analyses of the reaction residues, it can be seen that the phosphorus recovered in each case was recovered in an amount of practically 100 percent as red phosphorus.

Thus, it can be appreciated from the foregoing description that even in those cases where the various phosphorus oxyacids or their derivatives or phosphorus ore are used in preparing the titanium salts of phosphorus oxyacids, the several titanium salts of phosphorus oxyacids in which the titanium component has been fixed can be obtained. In addition, it is seen that by reacting these titanium salts of phosphorus oxyacids by heating them in a reducing temperature they are effectively processed regardless of the titanium salt of phosphorus oxyacid or derivative thereof used, and these salts are readily recovered as red phosphorus and rutile which possess high utility value.

EXAMPLE 4

This example illustrates a method of heat treatment in an atmosphere of carbon monoxide titanium phosphate prepared varying the $TiO_2:P_2O_5$ mole ratio.

A. Preparation of titanium phosphate gels of varying mole ratios.

In accordance with the procedure described in A 5.1 Example 1, the free sulfuric acid content of a sulfuric acid solution of titanium salt obtained by the acid decomposition of iron sand slag is brought to 10 weight percent by adding concentrated sulfuric acid. To 140 grams each of this solution are respectively added 2.1, 3.1, 3.6, 5.1, 15, 24 and 30 ml. of chemically pure reagent orthophosphoric acid, which solution are then formed into homogeneous liquid mixtures. Titanium phosphate gels of varying $TiO_2:P_2O_5$ mole ratios and not containing substantially any impure metallic constituents are prepared from the foregoing liquid mixtures.

Again, the titanium phosphate gel prepared by adding 5.1 ml. of orthophosphoric acid is also adjusted as to its mole ratio by partial dephosphatizing with ammonia water.

The mole ratios and impurities content of these several titanium phosphate gels are shown in Table IV.

B. Treatment of the hereinabove prepared several titanium phosphates by means of carbon monoxide.

The titanium phosphates which have been prepared as hereinbefore described with varying $TiO_2:P_2O_5$ mole ratios and wherein the phosphorus and titanium components have been fixed and purified are granulated and dried and prepared into dried products of columnar particulate form by operating as in Example 1.

These several dried products are each charged to a reaction tube of a reaction apparatus such as was used in Example 1. When, as in Example 1, they are maintained for about 90 minutes at 950°–1,000° C. using carbon monoxide, the phosphorus components of the titanium phosphate of the several mole ratios become phosphorus vapors, which are conducted by means of the gas used as the atmosphere acting as a carrier gas to a phosphorus recovery apparatus and condense as red phosphorus on the porcelain balls of the recovery apparatus maintained at 360°±5° C. The here formed red phosphorus is recovered as powdery red phosphorus by operating in each case as in Example 1.

On the other hand, when the several residues remaining in the reaction tubes after completion of the reactions are calcined at 800° C. in an oxygen atmosphere, pure white rutile is obtained in each case. Again, when the reflectivities of the several titanium dioxides obtained are determined as in Example 1, the reflectivity in each case was outstanding. The results are shown in Table IV.

Further, it can be seen from the analyses of the compositions of the reaction residues that the several red phosphorus products recovered have been recovered as pure red phosphorus at yields of substantially 100 percent.

It can be appreciated from the foregoing results that even when the titanium phosphates used are those prepared in varying ratios these titanium phosphates can be readily recovered as red phosphorus and rutile of high utility value regardless of their mole ratios by heating and reacting them in a reducing atmosphere.

TABLE III

| Starting phosphorus oxyacid | Titanium Salt of Phosphorus Oxyacid Gel | | | | | Recovered Rutile | | | | | |
|---|---|---|---|---|---|---|---|---|---|---|---|
| | Mole ratio, $TiO_2:P_2O_5$ | Content of Impurities | | | | Reflectivity, percent (Wavelength m$\mu$) | | | | Covering power, mm. | Phosphorus component contained, percent |
| | | V | Fe | As | F | 350 | 400 | 500 | 600 | | |
| Orthophosphoric acid ($H_3PO_4$) | 1.5:1 | − | − | − | − | 18.0 | 64.0 | 98.0 | 98.5 | 3.2 | 0 |
| Metaphosphoric acid ($HPO_3$) | 1.5:1 | − | − | − | − | 18.0 | 64.0 | 98.0 | 98.5 | 3.2 | 0 |
| Pyrophosphoric acid ($H_4P_2O_7$) | 1.5:1 | − | − | − | − | 18.0 | 64.0 | 98.0 | 98.5 | 3.2 | 0 |
| Sodium orthophosphate ($Na_2HPO_4 \cdot 12H_2O$) | 1.5:1 | − | − | − | − | 17.0 | 62.0 | 98.0 | 98.5 | 3.2 | 0 |
| Sodium metaphosphate ($NaPO_3$) | 1.6:1 | − | − | − | − | 17.0 | 62.0 | 97.0 | 97.0 | 3.2 | 0 |
| Sodium pyrophosphate ($Na_4P_2O_7$) | 1.4:1 | − | − | − | − | 17.0 | 62.0 | 97.0 | 97.0 | 3.2 | 0 |
| Calcium orthophosphate ($Ca_3(PO_4)_2$) | 1.4:1 | − | − | − | − | 16.0 | 67.0 | 97.5 | 97.5 | 3.3 | 0 |
| Ammonium orthophosphate ($NH_4)(HPO_4)$) | 1.4:1 | − | − | − | − | 17.0 | 63.0 | 97.5 | 97.5 | 3.2 | 0 |
| Sodium tripolyphosphate ($Na_5P_3O_{10}$) | 1.5:1 | − | − | − | − | 17.0 | 62.0 | 96.0 | 96.5 | 3.2 | 0 |
| Sodium phosphite ($Na_2HPO_3$) | 1.2:1 | − | − | − | − | 16.0 | 60.0 | 96.0 | 96.0 | 3.3 | 0 |
| Phosphorous acid ($H_3PO_3$) | 1.2:1 | − | − | − | − | 16.0 | 61.0 | 96.0 | 97.0 | 3.3 | 0 |
| Purified phosphorus ore (produced in Kola, U.S.S.R.) | 1.5:1 | − | − | − | − | 14.5 | 68.0 | 97.0 | 97.5 | 3.3 | 0 |

TABLE IV

| Starting Titanium Phosphate Gel | | | | | | | Recovered Rutile | | | | | |
|---|---|---|---|---|---|---|---|---|---|---|---|---|
| Amount added of phosphoric acid at time of preparation, ml. or dephosphatizing treatment | Mole ratio composition of resulting gel ($TiO_2:P_2O_5$) | Content of impurities | | | | Reflectivity, percent (Wavelength m$\mu$) | | | | Covering power, mm. | Phosphorus component contained, percent |
| | | V | Fe | As | F | 350 | 400 | 500 | 600 | | |
| 2.1 | 7.3:1 | | | | | 13.5 | 61.0 | 97.0 | 97.5 | 3.2 | 0 |
| 3.1 | 5.3:1 | | | | | 15.5 | 62.0 | 97.0 | 97.5 | 3.2 | 0 |
| 3.6 | 4.4:1 | | | | | 17.0 | 65.0 | 97.5 | 98.0 | 3.2 | 0 |
| 5.1 | 3.5:1 | | | | | 18.0 | 65.0 | 98.0 | 98.5 | 3.2 | 0 |
| 15.0 | 1.5:1 | | | | | 18.0 | 65.0 | 98.0 | 98.5 | 3.2 | 0 |
| 24.0 | 1:1 | | | | | 19.0 | 67.0 | 98.5 | 99.0 | 3.2 | 0 |
| 30.0 | 1.1:7 | | | | | 20.0 | 67.5 | 98.5 | 99.0 | 3.2 | 0 |
| Phosphoric ion removed with ammonia water | 7.6:1 | | | | | 14.5 | 61.0 | 96.5 | 97.0 | 3.2 | 0 |
| Phosphoric ion removed with ammonia water | 10.5:1 | | | | | 13.5 | 60.0 | 96.0 | 96.5 | 3.2 | 0 |

EXAMPLE 5

This example illustrates a method of heat treatment of purified gels of titanium phosphate and zirconium phosphate in an atmosphere of carbon monoxide after they have been treated at varying temperatures.

The gels of either titanium phosphate or zirconium phosphate prepared in accordance with the procedures described in A of Example 1 and A of Example 2 are each treated under the conditions of room temperature (in a desiccator containing a desiccant) × 24 hours, 50° C. × 3 hours, 100° C. × 1 hour, 500° C. × 30 minutes, 800° C. × 30 minutes and 1,000° C. × 30 minutes. As a result, titanium phosphate or zirconium phosphate of various kinds ranging from non-crystalline to crystalline are obtained. When the several titanium phosphates and zirconium phosphates that were treated under these various conditions were analyzed with an X-ray diffraction apparatus, it was found that the titanium phosphate or zirconium phosphate trated at room temperature, 50° C. and 100° C. were non-crystalline, but that when treated at 500° C., they were partially crystallized, and when treated at 800° C. and 1,000° C., they were completely crystalline.

Water is added to the titanium or zirconium phosphate that has been treated under different conditions in amounts of 50-60 weight percent thereof. With this water as the blending medium and by operating as in Example 1, the several phosphates are each granulated and made into dried products of form of small masses or columnar particulate form.

When the so obtained dried products are each charged to a reaction tube of a reaction apparatus such as was used in Example 1 and are maintained for about 90 minutes at 950°–1,000° C. as in Examples 1 and 2 using carbon monoxide, the phosphorus component which had been contained in the starting material as titanium or zirconium phosphate becomes phosphorus vapor which is conducted into the phosphorus recovery apparatus by means of the gas which was used as the atmosphere acting as a carrier gas to become condensed as red phosphorus on the porcelain balls of the recovery apparatus. The red phosphorus formed in each case is recovered as powdery red phosphorus by operating as in Example 1.

On the other hand, when the several residues remaining in the reaction tubes after the completion of the reaction are each calcined at 800° C. in an oxygen atmosphere, each are obtained as pure white rutile or zirconia. When these titanium dioxides or zirconium dioxides were each analyzed for their composition, none contained any phosphorus component and they were substantially 100 percent $TiO_2$ or $ZrO_2$. Further, when the reflectivities of these titanium dioxides or zirconium dioxides were determined as in Example 1, all demonstrated excellent reflectivities. The results obtained are shown in Table V.

Further, as is apparent from the results of the analysis of the compositions of the reaction residues, it is seen from the fact that no phosphorus component is contained at all in the residues that phosphorus is separated at a yield of practically 100 percent and is recovered in the form of red phosphorus requiring no further purification.

It can thus be appreciated from the foregoing results that even in the case of the non-crystalline or crystalline forms obtained by treating the gels of titanium phosphate or zirconium phosphate under differing temperature conditions, recovery of red phosphorus and rutile or zirconium dioxide of high utility value can readily be accomplished from the foregoing components regardless of the difference in form of crystallinity of the titanium phosphate or zirconium phosphate, by reacting the foregoing phosphates in an atmosphere or carbon monoxide.

TABLE V

| Treatment Conditions of the phosphate gel (° C.×hr.) | Class of phosphate | Recovered Oxide | | | | Phosphorus component contained, percent |
|---|---|---|---|---|---|---|
| | | Reflectivity, (percent) (Wavelength m$\mu$) | | | | |
| | | 350 | 400 | 500 | 600 | |
| Room temperature×24 | Titanium phosphate | 17.0 | 65.0 | 98.0 | 98.0 | 0 |
| | Zirconium phosphate | 77.0 | 97.0 | 103.0 | 103.5 | 0 |
| 50×3 | Titanium phosphate | 18.0 | 65.0 | 98.0 | 98.5 | 0 |
| | Zirconium phosphate | 78.0 | 97.5 | 103.5 | 104.0 | 0 |
| 100×1 | Titanium phosphate | 18.0 | 65.0 | 98.0 | 98.5 | 0 |
| | Zirconium phosphate | 78.2 | 97.5 | 103.5 | 104.0 | 0 |
| 500×0.5 | Titanium phosphate | 18.0 | 66.0 | 98.0 | 98.5 | 0 |
| | Zirconium phosphate | 80.0 | 98.0 | 104.0 | 104.0 | 0 |
| 800×5 | Titanium phosphate | 18.0 | 66.0 | 98.0 | 98.5 | 0 |
| | Zirconium phosphate | 79.0 | 98.0 | 104.0 | 104.0 | 0 |
| 1,000×0.5 | Titanium phosphate | 18.0 | 66.0 | 98.0 | 98.5 | 0 |
| | Zirconium phosphate | 79.0 | 98.0 | 104.0 | 104.0 | 0 |

EXAMPLE 6

This example illustrates a method of treatment of titanium phosphate wherein a carbon-incorporated titanium phosphate gel prepared from crude phosphoric acid, crude titanium salt solution and carbon black, and thereafter purified is heated in an atmosphere of carbon monoxide to form the phosphorus component which is recovered as red phosphorus while, on the other hand, the residue not containing the phosphorus component is calcined to thereby yield rutile.

A. Preparation of the purified carbon-incorporated titanium phosphate gel.

As the starting phosphoric acid component, 54.5 percent ($P_2O_5$) crude phosphoric acid is used. On the other hand, the 6.07 percent ($TiO_2$) crude titanium salt solution recovered from iron slag, as in A of Example 1, is used as the titanium component.

The foregoing crude phosphoric acid and crude titanium salt are used and by operating as described in A of Example 1 a flaky, blackish purple hydrogel is obtained.

The so obtained hydrogel of titanium phosphate is slurried into a pasty state by stirring with a commercial mixer (2,000 r.p.m.) after which a carbon black powder commercially available as acetylene black is added to the slurry in an amount of 20 weight parts per 100 weight parts of the dry titanium phosphate followed by stirring with the mixer to obtain a pasty slurry of carbon-incorporated titanium phosphate. When this carbon-incorporated pasty slurry is cast onto a heated plate in film form and heated for 30 minutes at 150° C., it becomes a gel of small masses of black flakes. When this gel is submitted to a washing treatment in hydrochloric acid solution (20 weight percent and then water-washed, the impure metallic constituents such as iron, aluminum, vanadium and magnesium contained in the starting materials are removed by the washing and a hydrogel of carbon-incorporated titanium phosphate containing substantially no impure metallic constituents is obtained.

When the so obtained purified carbon-incorporated titanium phosphate gel was analyzed for its content of impure metallic constituent by means of the emission spectrophotometric method of analysis, it was confirmed that it contained none of the impure constituents such as iron, aluminum, fluorine, lead, arsenic, vanadium, chromium, calcium and magnesium.

B. Treatment of carbon-incorporated titanium phosphate by means of carbon monoxide.

The hereinbefore obtained hydrogel of carbon-incorporated titanium phosphate is molded into pellets of columnar form about 1.5 mm. in diameter and about 5–15 mm. long, using an extrusion granulator (pelleter type) followed by thorough drying.

When these dried columnar particles of titanium phosphate are placed in a reaction tube of a reaction apparatus such as was used in Example 1 and are held for about 60 minutes at about 950°–1,000° C. by operating as described in B of Example 1 using carbon monoxide as the nonoxidizing atmosphere, the phosphorus component contained in the starting material as titanium phosphate becomes phosphorus vapor, which is conducted to the phosphorus recovery apparatus by means of the gas which was used as the atmosphere acting as a carrier gas to become condensed as red phosphorus on the porcelain balls of the recovery apparatus maintained at 360°±5° C., followed by being recovered as powdery red phosphorus as in Example 1.

On the other hand, a carbon-containing black, solid reaction residue of columnar particulate form remains in the reaction tube after the completion of the reaction. When this solid reaction residue is calcined at a temperature above 500° C. in an oxygen atmosphere, it becomes pure white. When this is analyzed for its composition, it is found to contain no phosphorus component at all and is substantially 100 percent titanium dioxide. When it is further calcined at above 800° C., titanium dioxide which has been converted to rutile, when analyzed by X-rays, is obtained. The reflectivities of this rutile are determined with an emission spectrophotometer, and its covering power is determined. The results obtained are shown in Table VI.

From the foregoing results, it is seen that when an impure carbon-incorporated titanium dioxide prepared from crude phosphoric acid, crude titanium salt solution and carbon black is, after its purification, heated in a nonoxidizing atmosphere of carbon monoxide, the reaction is completed earlier than in the case where the carbon is not incorporated (e.g., Example 1), and red phosphorus and rutile of high utility value are recovered satisfactorily.

TABLE VI

| Titanium Dioxide | 350 | Reflectivity (%) (Wavelength mμ) 400 | 500 | 600 | Covering Power (mm.) |
|---|---|---|---|---|---|
| Rutile obtained in present example | 20.0 | 65.0 | 98.0 | 98.5 | 3.2 |

EXAMPLE 7

This example illustrates a method wherein a mixed gel of titanium phosphate and zirconium phosphate is, after blending, heat treated in an atmosphere of carbon dioxide.

A. Preparation of the mixed gel of titanium phosphate and zirconium phosphate.

As the phosphoric acid component is chosen commercially available chemically pure reagent phosphoric acid (85 percent, sp. gr. 1.69).

As the titanium component is chosen commercially available chemically pure reagent titanium tetrachloride diluted by hydrochloric acid solution such that the content therein of the titanium component (calculated as $TiO_2$) is 10.0 grams per 100 ml. 100 Grams of crystals of commercially available chemically pure reagent zirconium nitrate [$ZrNO_3 \cdot 5H_2O$], are added to 200 ml. of the foregoing titanium tetrachloride solution and dissolved homogeneously therein, after which 37 ml. of 85 percent phosphoric acid ($H_3PO_4$) is added to the solution, followed by vigorously mixing the solution with a commercial mixer to thus obtain a homogeneous pasty gel mixture.

The so obtained pasty gel mixture of titanium phosphate and zirconium phosphate gels is extracted and removed of the impure metallic constituents it contains by using sulfuric acid solution of a concentration of 20 grams per 100 ml. and thereafter water-washed to obtain a mixed gel of titanium phosphate and zirconium phosphate containing substantially no impure metallic constituents.

When analyzed for its impurities content by means of emission spectrophotometry, it was confirmed that this mixed gel did not contain any vanadium, iron, arsenic, fluorine, aluminum or chromium.

After purifying the foregoing mixed gel of titanium and zirconium with hydrochloric acid, the powdered carbon black used in Example 6 is added thereto in an amount 20–30 percent in excess of the chemical reaction equivalent, based on the phosphoric acid component ($P_2O_5$) contained in the mixed gel, followed by thorough mixing of the two components with a commercial mixer to thus obtain a black mixed gel containing carbon. This carbon-incorporated mixed gel is molded as in Example 6 into columnar pellets having a diameter of about 1.5 mm., followed by drying to obtain dried carbon-incorporated titanium phosphate pellets of columnar form. B. Treatment of the mixed gel of titanium and zirconium by means of carbon monoxide.

The carbon-incorporated mixed gel prepared as described hereinbefore is charged to a reaction tube of a reaction apparatus such as was used in Example 1 and is held for about 60 minutes at 950–1,000°C., using carbon monoxide as the gaseous atmosphere, whereupon the phosphorous component becomes phosphorus vapor and is conducted by means of the gas of the atmosphere acting as a carrier gas into the phosphorus recovery apparatus, where it condenses as red phosphorus on the porcelain balls of the recovery apparatus maintained at 360°±5° C. The so formed red phosphorus is recovered as powdery red phosphorus by operating as in Example 1.

On the other hand, the residue containing the unreacted carbon, which remains in the reaction tube after the completion of the reaction, is calcined at 800° C. in an oxygen atmosphere. When the so obtained white calcined product is analyzed for its crystal structure by means of X-rays it was confirmed to be a mixture of rutile and zirconia. On the other hand, when observations of the particles of the white calcined product were made with an electron microscope, it was observed that the surface of the rutile of particle diameter about 0.1–0.5 micron was coated with about 0.08–0.02 micron of zirconium dioxide. Further, when, as in Example 1, the reflectivity of the white calcined product particles is measured, it is seen that it is a white pigment demonstrating especially good reflectivity in the ultraviolet region. These results are presented in Table VII. Furthermore, the result of an analysis of the composition of the reaction residue confirmed that no phosphorus component was present at all in the reaction residue.

It can thus be seen from the foregoing results that when carbon black powder is mixed with a mixed gel of titanium phosphate and zirconium phosphate and the resulting carbon-incorporated mixed gel is heat treated in a nonoxidizing atmosphere of carbon dioxide, red phosphorus and a white pigment consisting of rutile whose surface has been coated with zirconium dioxide, which possesses especially good reflectivity in the ultraviolet region, are obtained with no further requirement for purification of either of the products.

TABLE VII

Reflectivities of the Mixed Product of Rutile and Zirconium Dioxide According to the Present Invention

| Wavelength (mµ) | Reflectivity (%) |
| --- | --- |
| 350 | 75.0 |
| 400 | 98.0 |
| 500 | 102.0 |
| 600 | 102.5 |

EXAMPLE 8

This example illustrates the instance where heat treatment is carried out in a variety of nonoxidizing gaseous atmospheres, using either the purified titanium phosphate gel or zirconium phosphate alone or with the incorporation in these gels of carbon.

As the purified titanium phosphate gel, the gel obtained in accordance with the procedure described in A of Example 1 is used, while as the purified zirconium phosphate gel, that obtained as described in A of Example 2 is used, which gels are then prepared into the dried gels of columnar particulate form in accordance with the method described in Examples 1 and 2. On the other hand, the respective dried carbon-incorporated gels are prepared as in Example 7 by mixing the carbon black powder in either the purified titanium phosphate gel of zirconium phosphate gel obtained in accordance with Examples 1 and 2, molding the mixtures into pellets of columnar form and thereafter drying the gels.

The so prepared carbon-unincorporated and incorporated pellets of dried gels of columnar form are each charged to a reaction tube of a reaction apparatus such as was used in B of Example 1 and held there for 3 hours at 950°–1,000° C. in a nonoxidizing atmosphere.

As the nonoxidizing atmospheres used, four classes of gas are chosen: argon (Ar), nitrogen ($N_2$), a gas mixture (about 1:1 by volume) of carbon dioxide ($CO_2$) and carbon monoxide (CO), and a gas mixture (about 1:1 by volume) of nitrogen ($N_2$) and carbon monoxide (CO).

Each of the gels are heat treated under the several atmospheres, and the reaction residues are calcined at 800° C. in the presence of oxygen. The results of analyses of the resulting crystals and their reflectivities are shown in Table VIII.

The foregoing results show that in all cases where either carbon has been incorporated or carbon monoxide is present in the gaseous atmosphere the phosphoric acid component bonded as phosphate gel is removed and conversion to the oxide of respectively titanium or zirconium is achieved. However, it is seen that when a carbon-unincorporated phosphate gel is heat treated in a gaseous atmosphere of either argon or nitrogen, the dephosphatization does not take place and the phosphate remains unchanged. On the other hand, when the gaseous atmosphere was a gas mixture in which nitrogen was contained and the phosphate gel was one not containing carbon, only partial dephosphatization occurred but, even in this case, complete dephosphatization was possible when the reaction time was maintained for 6 hours.

TABLE VIII

| Non-oxidizin atmosphere | Whether or not carbon was added | Titanium Phosphate (P-Ti) or Zirconium Phosphate (P-Zr) | Calcined Product (800° C.) of Reaction Residue | | | | |
| --- | --- | --- | --- | --- | --- | --- | --- |
| | | | Cyrstal Type [1] (X-ray) | Reflectivity, percent (Wavelength mµ) | | | |
| | | | | 350 | 400 | 500 | 600 |
| Argon | Not added | P-Ti | P-T | 72.0 | 101.0 | 103.0 | 103.5 |
| Do | do | P-Zr | P-Z | 102.0 | 105.0 | 106.0 | 107.0 |
| Do | Added | P-Ti | R | 18.0 | 65.0 | 98.0 | 98.5 |
| Do | do | P-Zr | Z | 78.5 | 98.0 | 104.0 | 104.0 |
| Nitrogen | Not added | P-Ti | P-T | 70.0 | 100.0 | 100.0 | 101.0 |
| Do | do | P-Zr | P-Z | 102.0 | 105.0 | 106.0 | 107.0 |
| Do | Added | P-Ti | R | 18.0 | 65.0 | 98.0 | 98.5 |
| Do | do | P-Zr | Z | 78.5 | 98.0 | 104.0 | 104.0 |
| Gas mixture of carbon monoxide and carbon dioxide | Not added | P-Ti | R | 18.0 | 65.0 | 98.0 | 98.5 |
| Do | do | P-Zr | Z | 78.5 | 98.0 | 104.0 | 104.0 |
| Do | Added | P-Ti | R | 18.0 | 65.0 | 98.0 | 98.5 |
| Do | do | P-Zr | Z | 78.5 | 98.0 | 104.0 | 104.0 |
| Gas mixture of carbon monoxide and nitroegn | Not added | P-Ti | R | 56.0 | 99.0 | 100.5 | 100.5 |
| Do | do | P-Zr | Z | 85.0 | 103.0 | 103.0 | 103.5 |
| Do | Added | P-Ti | R | 18.0 | 65.0 | 98.0 | 98.5 |
| Do | do | P-Zr | Z | 78.5 | 98.0 | 104.0 | 104.0 |

[1] P-T: titanium phosphate; P-Z: zirconium phosphate; R: rutile; Z: zirconia.

EXAMPLE 9

This example illustrates a method of effectively treating titanium phosphate by mixing various classes of carbon in a purified titanium phosphate gel and heating the mixtures in an gaseous atmosphere of carbon monoxide.

As the purified titanium phosphate gel, that prepared in A of Example 1 is used.

Four classes of carbon are chosen: (a) a finely divided natural flaky graphite used in dry cells and of not more than 3.00 percent ash contents; (b) finely divided petroleum coke used as starting material in making artificial graphite and of not more than 0.5 percent ash content; (c) finely divided pitch coke used as starting material for making electrode graphite and of not more than 0.5 ash content; and (d) finely divided commercial active carbon of 1.2 percent ash content.

The purified titanium phosphate gel and the four classes of finely divided carbon are mixed and each of the mixtures are made into dried pellets of columnar form by operating as in Example 7.

These dried products of columnar particulate form are each charged to a reaction tube of a reaction apparatus such as was described in Example 1 and held for 60 minutes at 950°–1,000° C. by operating as in Example 1, using carbon monoxide as the gaseous atmosphere and carrier gas, whereupon each forms a phosphorus vapor which condenses as red phosphorus in the phosphorus recovery apparatus maintained at 350°±10° C. and is then recovered.

On the other hand, when the black residue remaining in the reaction tube after conclusion of the reaction is calcined for one hour at 800° C. in an oxygen atmosphere, titanium dioxide having rutile crystals as determined by X-ray analysis is obtained in each case. However, as to the whiteness of the product, this will vary proportionately with the ash content, i.e., the impurities contained in the carbon used. The greater the ash content, the lesser the whiteness. The reflectivities of each product were measured with the results shown in Table IX.

On the other hand, when an analysis of the composition of the residues for the phosphorus component was made, not even a trace amount of the phosphorus component could be quantitatively analyzed. Thus, it can be seen that practically 100 percent of the phosphorus component of the titanium phosphate is separated and removed as phosphorus vapor.

From the foregoing results it can be appreciated that not only is it possible to effectively treat titanium phosphate even when the treatment is conducted in a nonoxidizing atmosphere by mixing the various classes of carbon with the titanium phosphate, but also that it is best to use for the carbon one whose ash content is small and whose purification has been carried out sufficiently when it is intended to utilize the residue, say, for white pigment.

phosphate wherein the phosphorus component turns into phosphorus vapor while a part of the titanium component is converted into metallic titanium when a mixture of purified titanium phosphate gel and carbon is reduced by heating in a nonoxidizing atmosphere of argon.

As the purified carbon-incorporated titanium phosphate, the mixed gel prepared as in Example 6 and containing 30 weight parts per 100 weight parts of the phosphate, of carbon black is used. This is granulated and dried and made into a dried product of columnar particulate form.

As the reaction apparatus, the vertical type reaction apparatus such as was used in Example 1 is used, except that the method of introducing the nonoxidizing gaseous atmosphere has been changed. Instead of flowing the gas upwardly from the bottom, it is flowed downwardly from the top, i.e., the gas inlet port is provided at the top of the reaction tube, and the gas discharge port is provided at the bottom. Hence, the setup is such that the red phosphorus is recovered by conducting the forming phosphorus vapor from the discharge outlet port at the bottom of the reaction tube to a phosphorus recovery apparatus such as was described in Example 1 my means of the gas of the nonoxidizing atmosphere acting as the carrier gas.

Further, a wire (1.0 mm. in diameter) of metallic titanium is fashioned into a network of several layers. Ten grams of this network is carefully weighed (to the nearest mg. unit) and the so weighed network is suspended in the reaction tube. Hence, in this setup the metallic titanium vapor formed by reduction during the reaction is caused to condense on this wire network

TABLE IX

| Carbon Used | Phosphorus component reaction residue, percent | Reflectivity of the Calcined Product (800° C.) of the Reaction Residue, percent (Wavelength mµ) | | | |
|---|---|---|---|---|---|
| | | 350 | 400 | 500 | 600 |
| (a) Natural graphite powder | 0 | 9.0 | 55.0 | 94.0 | 94.5 |
| (b) Petroleum coke powder | 0 | 14.2 | 58.2 | 94.5 | 95.5 |
| (c) Pitch coke powder | 0 | 13.0 | 57.0 | 94.0 | 94.5 |
| (d) Commercial active carbon | 0 | 10.5 | 56.0 | 94.0 | 94.0 |

EXAMPLE 10

This example illustrates the method of recovering yellow phosphorus by treating either purified titanium phosphate gel or zirconium phosphate gel in the presence of carbon monoxide.

As the purified titanium phosphate gel and zirconium phosphate gel, the gels prepared by the procedures described in A of Example 1 and A of Example 2, respectively, are used.

The foregoing gels of titanium and ziconium phosphate are granulated, dried and made into dried products of columnar particulate form in accordance with the procedures described in Example 1 and 2.

Each of the foregoing dried products are charged to a reaction tube of a reaction apparatus such as was used in Example 1 and held for about 90 minutes at 950°–1,000° C. When the phosphorus vapor formed at this time in each of these cases is introduced along with carbon monoxide into water maintained at 90°–80° C., yellow phosphorus separates out into the hot water in spongy form. When this spongy yellow phosphorus is held in water at 55°±2° C., it becomes liquid yellow phosphorus having fluidity, the yellow phosphorus being recovered by collecting this liquid yellow phosphorus.

On the other hand, the residues remaining in the reaction tubes are given the after treatments as in Example 1 and 2, respectively, whereupon finely divided rutile and zirconium dioxide excelling in whiteness and not containing any phosphorus component at all are recovered respectively.

From the foregoing results, it is seen that yellow phosphorus and an oxide of either titanium or zirconium excelling in whiteness can be obtained by heat treating the purified phosphates of either titanium or zirconium in an atmosphere of carbon monoxide.

EXAMPLE 11

This example illustrates a method of treating titanium of metallic titanium.

Twenty grams of the dried mixed product of columnar particulate form, prepared as hereinbefore described, is carefully weighed into the reaction tube of the reaction apparatus which has been set up as hereinbefore described.

Next, argon (Ar) is flowed into this apparatus as the nonoxidizing gas atmosphere, at the rate of one liter per minute, and the temperature of the reaction tube is raised. When the reaction is carried out for 5 hours at 950°–1,000° C., the phosphorus vapor formed is recovered as red phosphorus and a part of the titanium component is reduced to metallic titanium and condenses on the wire network of metallic titanium suspended in the upper part of the reaction tube. Furthermore, condensation of metallic titanium having a dark gray metallic luster also takes place on the wall of the reaction tube. When after the conclusion of the reaction the wire network of metallic titanium, which had been suspended in the reaction tube, was taken out and weighed, it was found that about 10–9 percent of the titanium component (Ti) of the mixed gel, which had been charged to the reaction tube, was condensed as metallic titanium.

When the black residue remaining in the reaction tube after completion of the reaction is calcined at 800° C. in an oxygen atmosphere, white rutile having excellent reflectivity is recovered, and the presence of no phosphorus component was noted in the residue when it was analyzed for its composition.

From the foregoing results, it is seen that when a mixture of titanium phosphate and carbon is heat treated in a gaseous atmosphere of argon at least 10 percent of the titanium component is recovered as metallic titanium, while the titanium component remaining is recovered as rutile upon calcination of the resulting reaction residue in an oxygen atmosphere and, on the other hand, the phosphorus component is recovered as red phosphorus.

What we claim is:

1. A process for treating a titanium or zirconium salt of a phosphorus oxyacid, which comprises mixing a titanium or zirconium salt of a phosphorus oxyacid having the following composition expressed as the oxide $$MO_2 : P_2O_5 = 1 : 0.1 \text{ to } 1 : 1.5$$

wherein M is a titanium or zirconium atom, with 5 to 10 mols, per mol of the phosphorus oxyacid component ($P_2O_5$) in said salt, of carbon; heating the resultant mixture at a temperature of about from 950° C. to 1,000° C. in a nonoxidizing atmosphere; separating the vapor of phosphorus generated; thereafter, calcining the obtained solid residue in an oxygen atmosphere at a temperature not lower than 500° C.; and recovering the titanium oxide or zirconium oxide formed.

2. The process of claim 1 wherein the titanium of zirconium salt of phosphorus oxyacid has been washed free of mineral acid ions to such an extent that the content of the mineral acid ions in the wash liquid is less than 100 p.p.m.

3. A process for treating a titanium or zirconium salt of a phosphorus oxyacid, which comprises heating a titanium or zirconium salt of a phosphorus oxyacid having the following composition expressed as the oxide $$MO_2 : P_2O_5 = 1 : 0.1 \text{ to } 1 : 1.5$$

at a temperature of about 950° C. to 1,000° C. in the absence of carbon in an atmosphere of carbon monoxide; separating the vapor of phosphorus generated; thereafter, calcining the solid residue obtained in an oxygen atmosphere at a temperature not lower than 500° C.; and recovering the titanium oxide or zirconium oxide formed.

4. The process of claim 3 wherein the titanium or zirconium salt of phosphorus oxyacid has been washed free of mineral acid ions to such an extent that the content of the mineral acid ions in the wash liquid is less than 100 p.p.m.

* * * * *

UNITED STATES PATENT OFFICE
CERTIFICATE OF CORRECTION

S-390

Patent No. 3,650,681                    Dated March 21, 1972

Inventor(s) SUGAHARA ET AL

It is certified that error appears in the above-identified patent and that said Letters Patent are hereby corrected as shown below:

Page 6, column 11, Table III, after "Ammonium orthophosphate $(NH_4)$", insert -- 2 --.

Page 7, in Table IV under the heading "Mole ratio composition of resulting gel $(TiO_2:P_2O_5)$, the seventh entry, delete "1.1:7" and insert -- 1 : 1.7 --.

Page 9, the fifth entry under the heading "Reflectivity percent (Wavelength mu)"- the 500 column, delete "100.0" and insert -- 101.0 --. (Table VIII)

Page 9, Table VIII, under the 13th entry under the heading "Crystal Type (X-Ray)", insert -- P-T --.

Page 9, Table VIII, under the 14th entry under the heading "Crystal Type (X-Ray)", insert -- P-Z --.

Page 9, Table VIII, the first heading in column 17, delete "Non-oxidizin" and insert -- Non-oxidizing --.

Page 10, Table IX, after the word "component" in the heading "Phosphorus component reaction residue, percent", insert -- contained in --.

Page 10, Table IX, the first entry under the 500 column, delete "94." and insert -- 94.5 --. Delete the number "5" directly under the 600 column.

Page 11, Claim 2, after "titanium", delete "of" and insert -- or -

Signed and sealed this 25th day of July 1972.

(SEAL)
Attest:

EDWARD M. FLETCHER, JR.
Attesting Officer

ROBERT GOTTSCHALK
Commissioner of Patents